US011948438B2

(12) United States Patent
Candy et al.

(10) Patent No.: US 11,948,438 B2
(45) Date of Patent: Apr. 2, 2024

(54) EVENT DETECTION UNIT

(71) Applicants: Lawrence Livermore National Security, LLC, Livermore, CA (US); Christopher Roland Candy, San Ramon, CA (US)

(72) Inventors: James Vincent Candy, Danville, CA (US); Karl Albert Fisher, Brentwood (CA); Christopher Roland Candy, San Ramon, CA (US)

(73) Assignees: Lawrence Livermore National Security, LLC, Livermore, CA (US); Christopher Roland Candy, San Ramon, CA (US)

( * ) Notice: Subject to any disclaimer, the term of this patent is extended or adjusted under 35 U.S.C. 154(b) by 0 days.

(21) Appl. No.: 18/072,373

(22) Filed: Nov. 30, 2022

(65) Prior Publication Data

US 2023/0123536 A1 Apr. 20, 2023

Related U.S. Application Data

(63) Continuation of application No. 17/132,465, filed on Dec. 23, 2020, now Pat. No. 11,538,322.

(51) Int. Cl.
*G08B 17/08* (2006.01)
*G08B 3/10* (2006.01)
(Continued)

(52) U.S. Cl.
CPC ............... *G08B 17/08* (2013.01); *G08B 3/10* (2013.01); *G08B 5/36* (2013.01); *G08B 29/185* (2013.01)

(58) Field of Classification Search
CPC .... G01N 33/227; G08B 13/1672; G01S 5/18; G01S 3/802; Y10S 367/906; F41G 3/147
See application file for complete search history.

(56) References Cited

U.S. PATENT DOCUMENTS 7,460,605 B2 12/2008 Candy et al.
7,463,690 B2 12/2008 Candy et al.
(Continued)

OTHER PUBLICATIONS

Candy, J. "Bayesian Signal Processing: Classical, Modern, and Particle Filtering Methods," 2nd Ed., N.J.: J. Wiley/IEEE Press, 2016.
(Continued)

*Primary Examiner* — Mirza F Alam
(74) *Attorney, Agent, or Firm* — Perkins Coie LLP

(57) ABSTRACT

An event detection unit (EDU) for detecting an explosive event is provided. The EDU includes different types of sensors for measuring characteristics of an explosive event. The EDU includes an event notification component. The EDU also includes a processor that receives a measurement from the sensors and generates a combined non-event probability and a combined event probability based on that measurement that indicates a likelihood that an explosive event has not occurred or has occurred. The processor determines whether an explosive event has occurred based on the non-event probabilities and event probabilities. When an explosive event has been determined to occur, the processor directs the event notification component to output a notification that an explosive event has occurred.

20 Claims, 6 Drawing Sheets

(51) Int. Cl.
*G08B 5/36* (2006.01)
*G08B 29/18* (2006.01)

(56) References Cited

U.S. PATENT DOCUMENTS

| | | | |
|---|---|---|---|
| 2003/0117279 A1 | 6/2003 | Ueno et al. | |
| 2004/0100868 A1* | 5/2004 | Patterson, Jr. | G01R 31/085 367/127 |
| 2006/0111844 A1* | 5/2006 | Chandler | G06F 17/18 702/1 |
| 2008/0165621 A1* | 7/2008 | Fisher | G01S 5/22 367/118 |
| 2016/0097756 A1* | 4/2016 | Borkholder | G09B 19/00 73/35.15 |
| 2016/0209390 A1* | 7/2016 | Overcast | G01N 33/227 |
| 2016/0267758 A1 | 9/2016 | Beiler et al. | |
| 2018/0158305 A1* | 6/2018 | Noland | G08B 15/00 |
| 2018/0253404 A1 | 9/2018 | Moore et al. | |
| 2020/0135008 A1 | 4/2020 | Horgan et al. | |

OTHER PUBLICATIONS

Candy, J. et al. "Localization Based on Time-Reversed Event Sounds," U.S. Appl. No. 16/943,250, filed Jul. 30, 2020, 40 pages.
Candy, James V. et al. "Time-Reversal Processing for an Acoustic Communications Experiment in a Highly Reverberant Environment," J. Acoust. Society Amer., vol. 115, (5), p. 1621-1631, Dec. 2004.
Candy, James V. et al. "Wideband Multichannel Time-Reversal Acoustic Communications in Highly Reverberant Environments," J. Acoust. Society Amer., vol. 120, (2), p. 838-851, Nov. 2006.
Chair, Z. et al. "Optimal data fusion in multiple sensor detection systems," Aerospace and Electronic Systems, IEEE Transactions, vol. AES-22, No. 1, pp. 98-101, 1986.
Chamberland, J.F. et al. "Decentralized detection in sensor networks," Signal Processing, IEEE Transactions, vol. 51, pp. 407-416, Feb. 2003.
Cover, T.M. et al. "Elements of information theory," New York, NY, USA: Wiley-Interscience, 1991.
DiGiulian, T. "Muzzle Flash," NavWeaps, History and Technology, <www.navweaps.com/>, 2006.
Harney, R. "Combat Systems I: Sensors," Naval Post Graduate School, <www.nps.edu>, 2006.
International Search Report and Written Opinion received in Application No. PCT/US21/64541, dated Apr. 22, 2022, 11 pages.
Luzi, L. et al. "Acoustic firearm discharge detection and classification in an enclosed environment," J. Acoust. Soc. Am., 139 (5), p. 2723-2731, (2006).
Maher, R.C. "Acoustic characterization of gunshots," IEEE SAFE Workshop, Wash. DC, p. 109-113, (2007).
Maher, R.C. "Audio forensic examination," IEEE Signal Proc. Magz., p. 84-94, (2009).
Maher, R.C. et al. "Deciphering gunshot recordings," AES 33rd International Conference, Denver, CO, (2008).
Papoulis, A. et al. "Probability, Random Variables and Stochastic Processes," 4th ed., New York, NY: McGraw-Hill, 2002.
Tenney, R. et al. "Detection with distributed sensors," Aerospace and Electronic Systems, IEEE Transactions, vol. AES-17, No. 4, pp. 501-510, 1981.
Thomopoulos, S. et al. "Optimal distributed decision fusion," Aerospace and Electronic Systems, IEEE Transactions, vol. AES-25, No. 5, pp. 761-765, 1989.
Tsitsiklis, J.N. "Decentralized Detection," Advances in Signal Processing, vol. 2, pp. 297-344. 1993.
Wald, A. "Sequential tests of statistical hypothesis," Ann. Math. Stat., 16, pp. 117-186, 1945.
Wikipedia, The Free Encyclopedia, s.v. "Muzzle Flash," <en.wikipedia.org/windex.php?title=Muzzle_flash&oldid=966050753>.
Yan, Q. et al. "Distributed signal detection under the Neyman-Pearson criterion," Informational Theory, IEEE Transactions, vol. 47, pp. 1368-1377, May 2001.
Zhiqun, X.L. et al. "Source-localization algorithms and applications using time of arrival and time difference of arrival measurements," Rev. Sci. Instrum., 87, p. 041502-1:12, (2016).

* cited by examiner

EVENT DETECTION UNIT

CROSS-REFERENCE TO RELATED APPLICATION

This application is a continuation of U.S. patent application Ser. No. 17/132,465 filed on Dec. 23, 2020, which is hereby incorporated by reference in its entirety.

STATEMENT REGARDING FEDERALLY SPONSORED RESEARCH

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND

Active shooter incidents have become increasingly common, especially in the United States. The Federal Bureau of Investigation reports that there have been several hundred active shooter incidents since 2000. These incidents have occurred at schools, malls, churches, theaters, and so on. The damage, including the death toll and emotional pain caused from these incidents, is immeasurable.

Attempts have been made to help first responders more effectively respond to these incidents in real time. One example is the development of technology to both detect that an incident is occurring and identify the location of the shooter—referred to as a detection/localization system. A variety of detection/localization systems have been deployed throughout the United States to detect and locate shooters who are outdoors. Unfortunately, the detection and localization of incidents that occur indoors present problems that are different from incidents that occur outdoors. Sound propagating in enclosed spaces creates a unique problem for indoor detection and localization because of inherent obstructions causing transmitted sounds or signals to bounce (reflect), bend (refract), and spread (disperse) in many directions, distorting both their shape and their amplitudes. As a result, arrival times at receiver locations make simple triangularization techniques (as used in outdoor processing) very challenging and usually erroneous. Schools and hospitals are examples of environments that present challenges for detection/localization. A typical public high school has many classrooms and meeting rooms connected to intersecting hallways. The rooms have different shapes, heights, content, and so on depending on their purpose (e.g., lunchroom, chemistry lab, or library). The hallways may have different characteristics at their intersections and may have different content (e.g., lockers, bookshelves). A hospital environment is even more complex because equipment is frequently moved from room to room, stored in hallways, and so on. Because sound from the firearm of an active shooter follows multiple paths through such environments, localization is a difficult problem.

An indoor detection/localization system for shooters who are indoors is described in U.S. patent application Ser. No. 16/943,250, entitled "Localization Based on Time-Reversed Event Sound," filed on Jul. 30, 2020, which is hereby incorporated by reference. That indoor detection/localization system relies on a centralized sensor array to receive sounds and processes the sounds using a time-reversal technique. Although that indoor detection/localization system is effective, it would be desirable to have a system that is less costly in terms of hardware, installation, and calibration.

DETAILED DESCRIPTION

An event detection unit is provided that includes one or more sensors and a processor for analyzing sensor readings and determining whether an event has occurred. The event detection unit (EDU) may be installed in a room (e.g., in a light socket or an electrical outlet) so that the sensors can measure characteristics (e.g., sound and light) of an event and the processor can determine whether an event has occurred in that room (or nearby). The EDU also includes a notification component so that when an event is detected, the EDU can output a notification via the notification component. For example, the notification component may be a light that flashes, a siren that blares intermittently, a communications interface (e.g., WiFi) for notifying authorities, and so on. The EDU may be adapted to detect explosive events such as those caused by a gun, a stun grenade, a firecracker, and so on.

Figure 1:
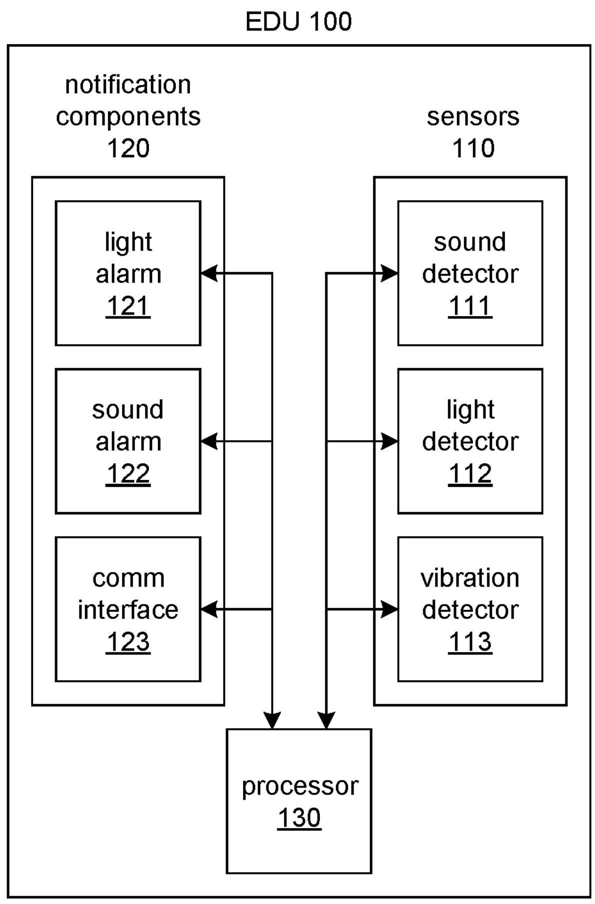
FIG. 1 illustrates components of an event detection unit in some embodiments.

FIG. 1 illustrates components of an event detection unit in some embodiments. EDU 100 includes sensors 110, notification components 120, and processor 130. The sensors include sound detector 111, light detector 112, and vibration detector 113. The notification components include light alarm 121, sound alarm 122, and communications interface 123. The processor includes a central processing unit and a memory with computer instructions that implement a detection algorithm. The processor receives measurements (also referred to as readings) from the detectors and applies the detection algorithm to detect whether an event has occurred. If an event is detected, the processor may activate the light alarm and sound alarm and may also send a notification to an authority via the communication interface, which may be a wired or wireless interface. The sound detector may be a microphone, the light detector may be an infrared detector, and the vibration detector may be an accelerometer.

Although the EDU is described primarily in the context of detecting explosive events, it may be used to detect other types of events. For example, the EDU may be used to detect lightning strikes. An EDU may be located on a cell tower in an area in which lightning is common. When a lightning strike occurs, the light detector detects the flash, and the vibration and sound detectors detect the vibration and the sound shortly after the lightning strike depending on the distance of the lightning strike from the EDU. The EDU may also include other types of detectors such as a motion detector that transmits and receives. A motion detector may be used to help identify certain types of events, such as an explosion that causes flying debris.

In some embodiments, the EDU determines whether an event has occurred based on an event probability distribution and a non-event probability distribution. The event probability distribution for a sensor indicates the probability that an event has occurred given a sensor reading. For example, if the sensor is a microphone with a reading of 150 dB, the event probability of that reading representing a gunshot event may be 0.9. The non-event probability distribution indicates the probability that an event has not occurred given a sensor reading. For example, for the reading of 150 dB, the non-event probability of that reading representing that no event has occurred may be 0.01. The non-event probability distribution represents noise such as background noise of the environment and instrumentation noise of the sensors. For example, for a reading of 75 dB, the non-event probability may be low in a noisy environment, and the non-event probability may be high in a quiet environment.

Given a reading for each of the sensors, the EDU combines the event probabilities to generate a combined event probability and a combined non-event probability representing a joint probability based on the readings. The combined event probability also factors in the non-event probabilities. The EDU then generates a detection score based on the combined event probability and the combined non-event probability. The EDU determines whether the detection score satisfies an event detection criterion such as an event detection threshold. If the detection score is above an event detection threshold, an event is detected. If the detection score is below a non-event threshold, no event is detected. The event detection threshold and non-event threshold may be the same. If they are not the same, a detection score between the thresholds would indicate that it cannot be determined whether an event has occurred or not. If it cannot be determined, the EDU may not provide any notification or may provide a low-priority notification to an authority without providing a visual or audible alarm. The use of thresholds that are not the same may help to eliminate false positives and false negatives. For example, if both thresholds are 0.9, a detection score of 0.89 might be generated as a result of a gunshot (false negative) and a detection score of 0.91 might be generated even though there was no gunshot (false positive). However, an event detection threshold at 0.92 and a non-event threshold at 0.80 may help to prevent such false negatives and false positives.

In some embodiments, the EDU may also weight the probabilities of the sensors to reflect the effectiveness of each sensor in detecting an event in different environments. For example, if the EDU is to be placed in a classroom that is used for band practice, the weight for a microphone may be low so that the sound of cymbals crashing will not cause a gunshot event to be detected. As another example, if the EDU is placed in a welding shop, the weight for a light detector may be low so that the light generated when welding will not cause a gunshot event to be detected. The weights may be learned during a calibration phase based on the actual environment (e.g., while a band plays in the classroom) or in a test environment (e.g., by playing loud band music in a calibration room). The type of environment may be factored into the background noise. For example, the background probability for sound may be high when cymbals crash in the classroom used for band practice.

In some embodiments, the EDU may process readings in a batch mode or a sequential mode. When it is operating in batch mode, the EDU may collect sensor readings at buffer intervals and periodically determine whether an event has occurred. For example, the EDU may collect sensor readings every 0.01 seconds and determine whether an event occurred every second. For each sensor, the EDU may generate a cumulative event probability and a cumulative non-event probability based on the 100 sensor readings for that sensor. For example, the cumulative event probability for a sensor may be the product of the event probabilities for that sensor. The EDU may generate a combined event probability from the cumulative event probabilities of the sensors and the cumulative non-event probabilities and a combined non-event probability from the cumulative non-event probabilities. The EDU then generates a detection score based on the combined event probability and the combined non-event probability.

When it is in sequential mode, the EDU may determine whether an event has occurred at each sample interval. Continuing with the example, the EDU would make 100 determinations of whether an event has been detected. At each interval, the EDU generates an event probability and a non-event probability for each sensor given the current sensor readings. The EDU then generates a combined event probability and a combined non-event probability. The EDU generates a detection score based on the combined event probability, the combined non-event probability, and the detection score of the prior interval. When the EDU is operating in sequential mode, the event probability and the non-event probability may be based on both the current readings and a collection of prior readings. The probabilities based on the prior readings help to prevent false positives. For example, if the current readings indicate that an event has occurred, but the prior readings do not, the current readings may be spurious, so no event is detected. If, however, the prior readings indicate an increasing probability that an event has occurred but has not yet been detected, the current readings in light of the prior readings may indicate that an event has indeed occurred.

Figure 2:
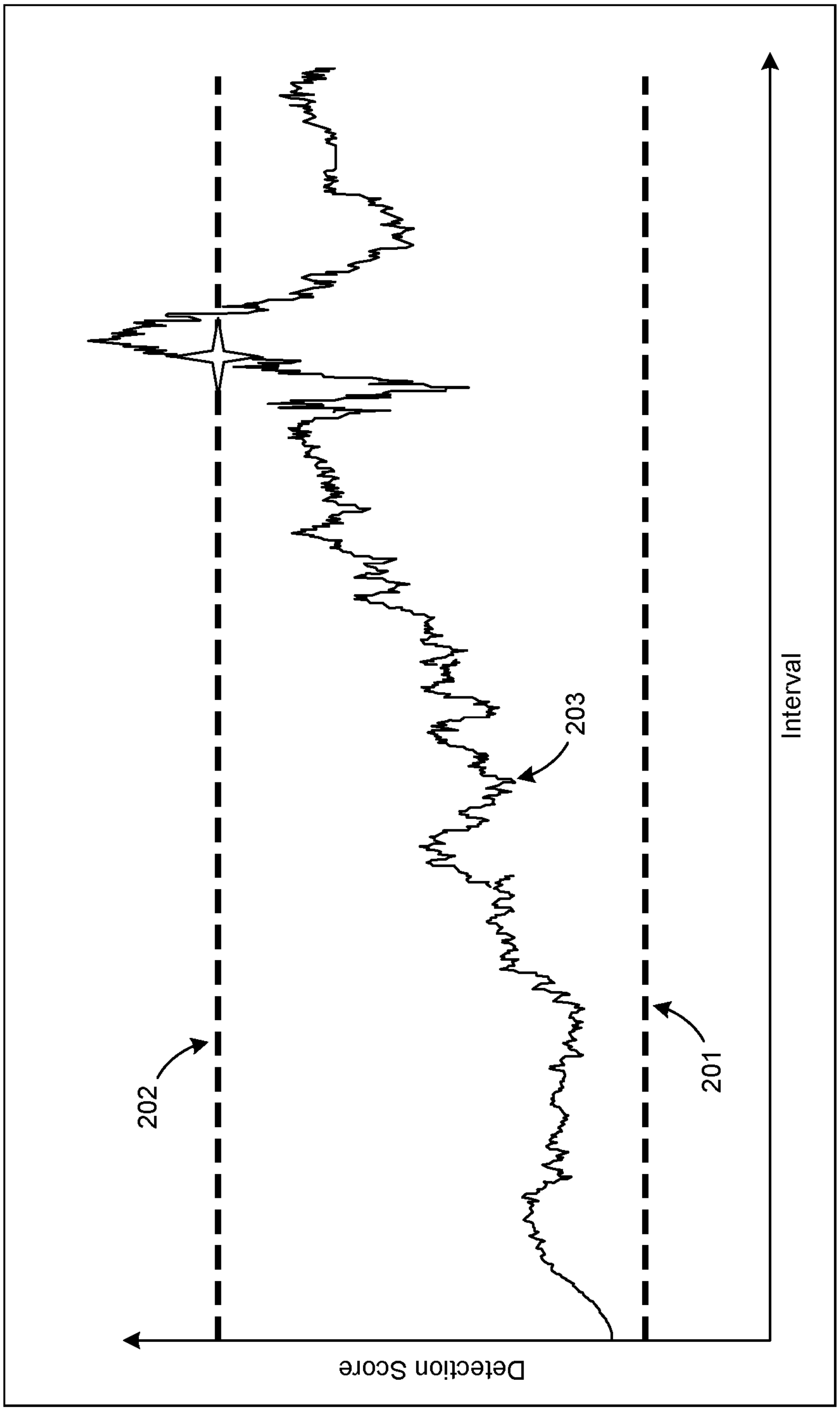
FIG. 2 illustrates a graph of example detection scores over time when in sequential mode.

FIG. 2 illustrates a graph of example detection scores over time when the EDU is in sequential mode. The X-axis represents the intervals, and the Y-axis represents the detection score. Line 201 represents the non-event threshold, and line 202 represents the event detection threshold. Graph 203 represents the detection score at each interval. When the detection score is above the event detection threshold, a decision is made that an event has been detected. When the detection score is below the non-event threshold, a decision is made that no event has occurred. When the detection score is in between, no decision has yet been made.

In some embodiments, a central detection system aggregates event detection notifications that are received from multiple EDUs and makes a final determination of whether an event has occurred. For example, eight EDUs may be installed in a sports arena. If an event occurs, some of the EDUs may detect the event and notify the central detection system. If the number of notifications satisfies a collective event criterion, the central detection system detects that an event has occurred and may notify all the EDUs to activate an alarm. If the number does not exceed the collective event criterion, the central detection system assumes the notifications represent a false positive and does not notify the EDUs to activate an alarm. A false positive may occur in a sports arena, for example, when the flash of a camera is nearby an EDU at the time the crowd jumps up and cheers, causing light, sounds, and vibrations that may be similar to a gunshot. The collective event criterion may be based on the number of EDUs that sent event detection notification (e.g., all, a majority, or a certain fraction). The collective event criterion may also be based on proximity of the EDUs that send notifications. For example, if two EDUs near each other send notifications, an event may be detected. However, if two EDUs that are not near each other send notifications, an event may not be detected.

Figure 6:
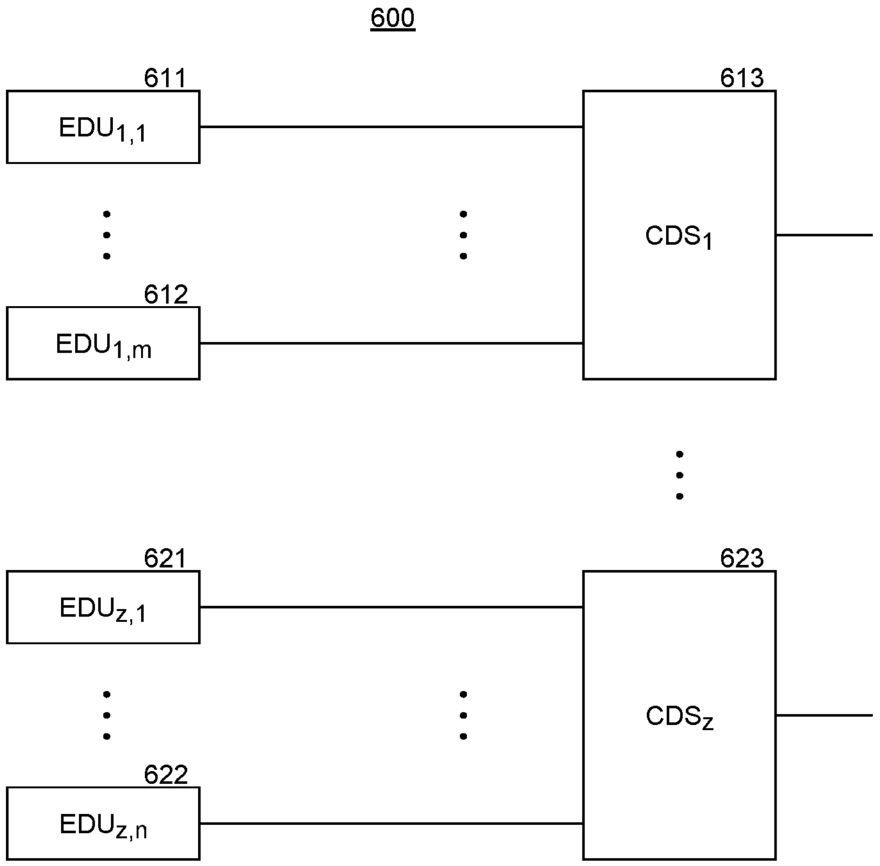
FIG. 6 illustrates a central detection system in some embodiments.

FIG. 6 illustrates a central detection system in some embodiments. A building such as a school may have EDUs located throughout the building. The EDUs are assigned to groups depending on their proximity to each other. For example, EDUs in classrooms at the end of a long hallway may be assigned to one group, and EDUs in classrooms at the other end may be assigned to another group. For example, $EDU_{1,1}$ 611 through $EDU_{1,m}$ 612 represent m EDUs that are assigned to group 1, and $EDU_{z,1}$ 621 through $EDU_{z,n}$ 622 represent n EDUs that are assigned to group z. Each group of EDUs is connected (e.g., wirelessly) to a central detection system (CDS). For example, $EDU_{1,1}$ through $EDU_{1,m}$ are connected to $CDS_1$ 613 and $EDU_{z,1}$ through $EDU_{z,n}$ are connected to $CDS_z$ 623. An EDU may be assigned to multiple groups. For example, an EDU in the middle of the long hallway may be considered to be in proximity of the EDUs at both ends of the hallway and thus may be assigned to both groups. A CDS may track the locations of events (e.g., gunshots from a moving shooter) as they occur based on the EDUs that detect the events. A CDS may also be able to identify that events are caused by multiple actors (e.g., shooters). For example, if a gunshot is detected in one classroom and 0.5 seconds later a gunshot is detected in another classroom, multiple shooters may be detected because it may be impossible for the shooter to move between the classrooms in 0.5 seconds.

In some embodiments, EDUs may be in direct communication with each other EDU to help reduce false positives and help localize the event. Continuing with the sports arena example, each EDU may be in communication with each other EDU. When an EDU detects an event, it sends to one or more other EDUs an event notification indicating that it has detected an event. If that EDU also receives an event notification, it makes a final determination that an event has occurred and, for example, activates an alarm. If that EDU does not receive such an event notification, it may assume that it detected a false positive. If a final determination is made that an event has occurred, the EDU may notify the other EDUs (e.g., in the same building) that an event was detected by that detecting EDU. The other EDUs can provide notifications, for example, to guide first responders to the detecting EDU. For example, the notifications may be that the EDUs flash lights at greater speed the closer they are to the detecting EDU. As another example, the EDUs may output audio instructions such as "turn right at next hallway." As another example, the EDUs may interface with an existing emergency lighting system or public address system.

The event detection algorithm may be represented mathematically as described in the following. The null hypothesis $H_0$ represents the sensor readings when an event has not occurred (e.g., noise), and the event hypothesis $H_1$ represents the sensor readings when an event has occurred. The hypotheses are represented by the following equations:

$$H_0 : y(t) = n(t)$$

$$H_1 : y(t) = s(t) + n(t)$$

where y(t) is a vector representing the sensor readings at time t, n(t) is a vector representing the contribution of the noise to the sensor readings at time t, and s(t) is a vector representing the contribution of the gunshot to the sensor readings at time t. The vectors include a value for each sensor. For example, the vector s(t) is represented by the following equation:

$$s(t) := \begin{bmatrix} \underbrace{y_{inf}(t)}_{infrared} \\ \underbrace{y_{snd}(t)}_{sound} \\ \underbrace{y_{vib}(t)}_{vibration} \end{bmatrix}$$

The probability of a hypothesis being satisfied given a measurement (i.e., a likelihood function) is represented by the following:

$$Pr[y(t) \mid H_\ell]; \ell = 0,1$$

where Pr represents the probability. When the EDU is in batch mode, the likelihood ratio of the probabilities may be represented by the following equation:

$$L[Y_N] = \frac{Pr[Y_N \mid H_1]}{Pr[Y_N \mid H_0]} = \frac{\prod_{t=0}^{N} Pr[y(t) \mid H_1]}{\prod_{t=0}^{N} Pr[y(t) \mid H_0]}$$

where L represents the likelihood ratio. The EDU may employ a decision function to generate a detection score that is based on the natural logarithm of the likelihood functions and may be represented by the following equation:

$$\Lambda[Y_N] = \ln Pr[Y_N \mid H_1] - \ln Pr[Y_N \mid H_0] = \sum_{t=0}^{N} \ln Pr[y(t) \mid H_1] - \sum_{t=0}^{N} \ln Pr[y(t) \mid H_0]$$

where Λ represents the detection score. A Neyman-Pearson detector may be represented by the following equation:

$$\Lambda[y(t)] \underset{H_0}{\overset{H_1}{\gtrless}} \ln \tau$$

where τ represents the detection threshold above which $H_1$ is satisfied and below which $H_0$ is satisfied.

When the EDU is in sequential mode, rather than basing a decision based on a cumulative event probability (e.g., product of the probabilities) over multiple intervals, the EDU instead bases a decision on the current measurement and a number of prior measurements and the detection score for the prior interval. The probability that the current measurement satisfies a hypothesis may be represented by the following equation:

$$Pr[Y_N \mid H_\ell] = Pr[y(N), Y_{N-1} \mid H_\ell] = Pr[y(N) \mid Y_{N-1}, H_\ell] \times Pr[Y_{N-1} \mid H_\ell]; \ell = 0,1$$

and the decision function may be represented by the following equation:

$$\Lambda[Y_t] := \ln L[Y_t] = \Lambda[Y_{t-1}] + \ln Pr[y(t) \mid Y_{t-1}, H_1] - \ln Pr[y(t) \mid Y_{t-1}, H_0]$$

The detection of an event may be based on the following:

$\Lambda[Y_t] > \ln \tau_1$ Accept $H_1$ $\ln \tau_0 \leq \Lambda[Y_t] \leq \ln \tau_1$ Continue $\Lambda[Y_t] < \ln \tau_0$ Accept $H_0$ where "Continue" indicates that no decision has yet been made as to whether an event has occurred or not occurred. The thresholds may be determined based on a simulation or a controlled experiment to determine a probability of a true positive and a probability of a false positive. The threshold may be represented by the following equations:

$$\tau_0 = \frac{1 - P_{DET}(t)}{1 - P_{FA}(t)};\ \tau_1 = \frac{P_{DET}(t)}{P_{FA}(t)}$$

where $P_{DET}$ represents the probability of a true positive and $P_{FA}$ represents the probability of a false positive or false alarm.

The EDU may employ an event and non-event probability distribution for each sensor that may be, for example, a Gaussian or Poisson distribution. A Gaussian distribution may be represented by its mean and variance and the probabilities may be represented by the following equation:

$$Pr[y_x(t) \mid Y(t)] \sim N(\mu_x, \sigma_x^2) = \frac{1}{\sqrt{2\pi\sigma_x}} \exp\left\{-\frac{(y_x(t) - \mu_x)^2}{2\sigma_x^2}\right\}$$

where x represents a sensor type, background noise, or instrumentation noise. The combined probability of the sensors for an event or non-event may be represented by the following equation:

$$Pr[y(t)] = \sum_{n=1}^{N} p_n N(M_n, V_n) = \sum_{n=1}^{N} \frac{p_n}{\sqrt{2\pi V_n}} \exp\left\{-\frac{1}{2}\frac{(y(t) - M_n)^2}{V_n}\right\}$$

where N represents the number of components (number of sensors plus noise sources), $M_n$ represents the mean for component n, $V_n$ represents the variance for component n, and $p_n$ represents the weight for component n where the sum of the weights equal 1.0.

Figure 3:
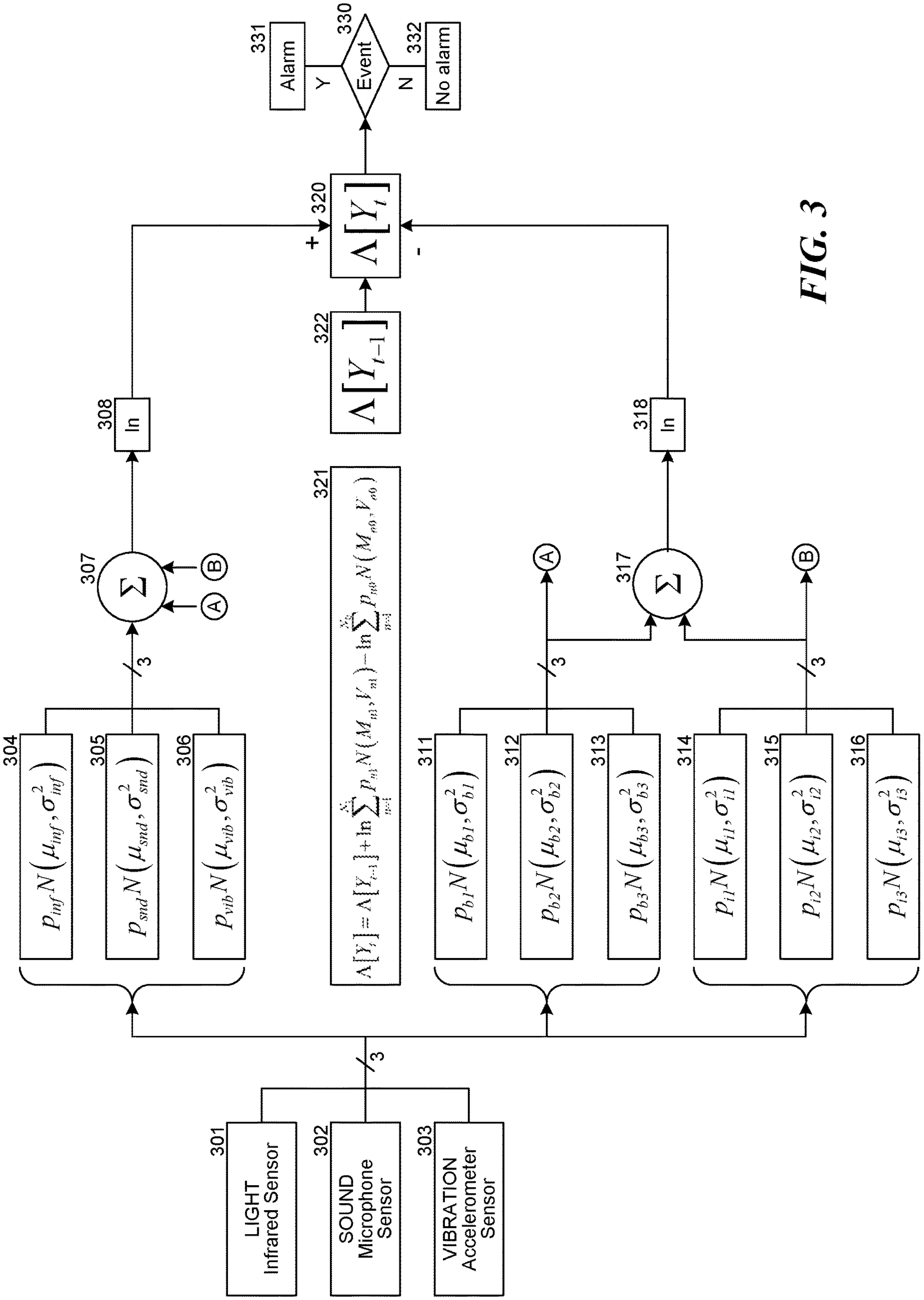
FIG. 3 is a block diagram that illustrates event detection.

FIG. 3 is a block diagram that illustrates event detection. The readings are input from sensors 301-303. Blocks 304-306 represent the calculation of the event probabilities for the light, sound, and vibration sensors. Blocks 311-313 represent the calculation of background noise probabilities, and blocks 314-316 represent the calculation of instrumentation noise probabilities. Circle 307 represents the calculation of the combined event probability that factors in the event probabilities and non-event probabilities (background and instrumentation). Circle 317 represents the calculation of the combined non-event probability. Blocks 308 and 318 represent the calculation of the logarithm of the combined event probability and the combined non-event probability. Block 322 represents the calculation of the detection score of the prior interval. Block 320 represents the calculation of the detection score for the current interval. Block 321 represents the detection equation used to generate the detection score. Decision block 330 represents the determination of whether the detection score indicates that an event has occurred. If an event is detected, block 331 illustrates activating an alarm. Otherwise, block 332 represents not activating an alarm.

In some embodiments, the sensors of an EDU may include a microelectromechanical system (MEMS) accelerometer such as the Analog Devices ADXL372 chip. The sensors may also include an audio sensor with a recording time of 10 seconds, a sampling frequency of 6.4 kHz, and a dimension of 37×35 mm. The sensors may also include a light sensor such as a phototriode light sensor. The EDU may also include a processor that is an Arduino processor that runs at 16 MHz, that has 10 digital and 5 analog pins, and that is 20×22 mm. Because of the small size of the sensors, the processor, and the notification components, the EDU may have a small footprint and can be installed in existing receptacles such as light switches, power outlets, emergency exit equipment, and smoke detectors. These receptacles have sufficient power for the EDU. The EDU may also have a battery so that it can operate when power to the receptacle is cut off.

Figure 4:
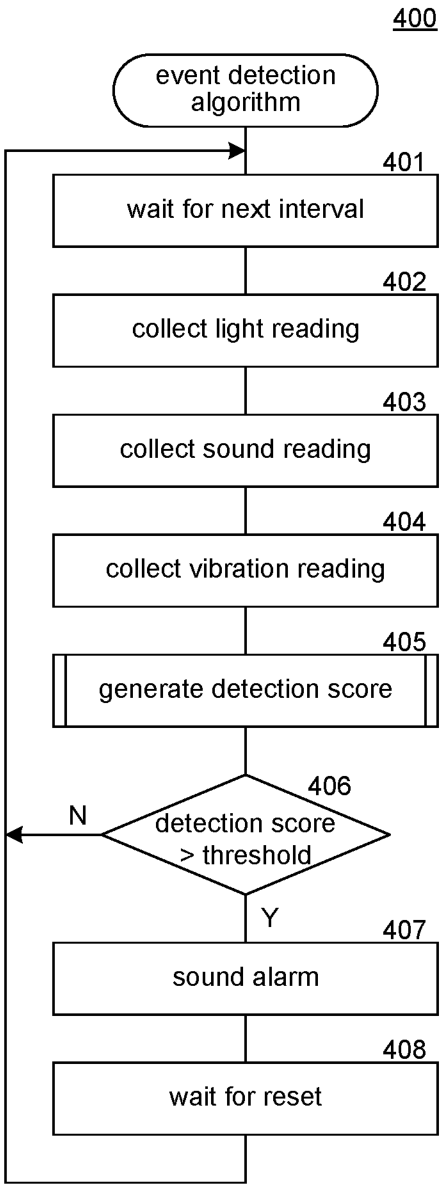
FIG. 4 is a flow diagram that illustrates the event detection algorithm executed by the processor in some embodiments.

FIG. 4 is a flow diagram that illustrates the event detection algorithm executed by the processor in some embodiments. When executing the algorithm 400, the processor loops, generating a detection score for each interval, determining whether detection score satisfies a threshold, and activating an alarm when it does. In block 401, the processor waits for the next interval. In block 402, the processor collects a light reading from the light sensor. In block 403, the processor collects a sound reading from the sound sensor. In block 404, the processor collects a vibration reading from the vibration sensor. In block 405, the processor invokes a generate detection score component to generate a detection score. In decision 406, if the detection score is above the threshold, then the processor continues at block 407, else the processor loops to block 401 to wait for the next interval. In block 407, the processor activates an alarm. In block 408, the processor waits for a reset indication and then loops to block 401 to wait for the next interval.

Figure 5:
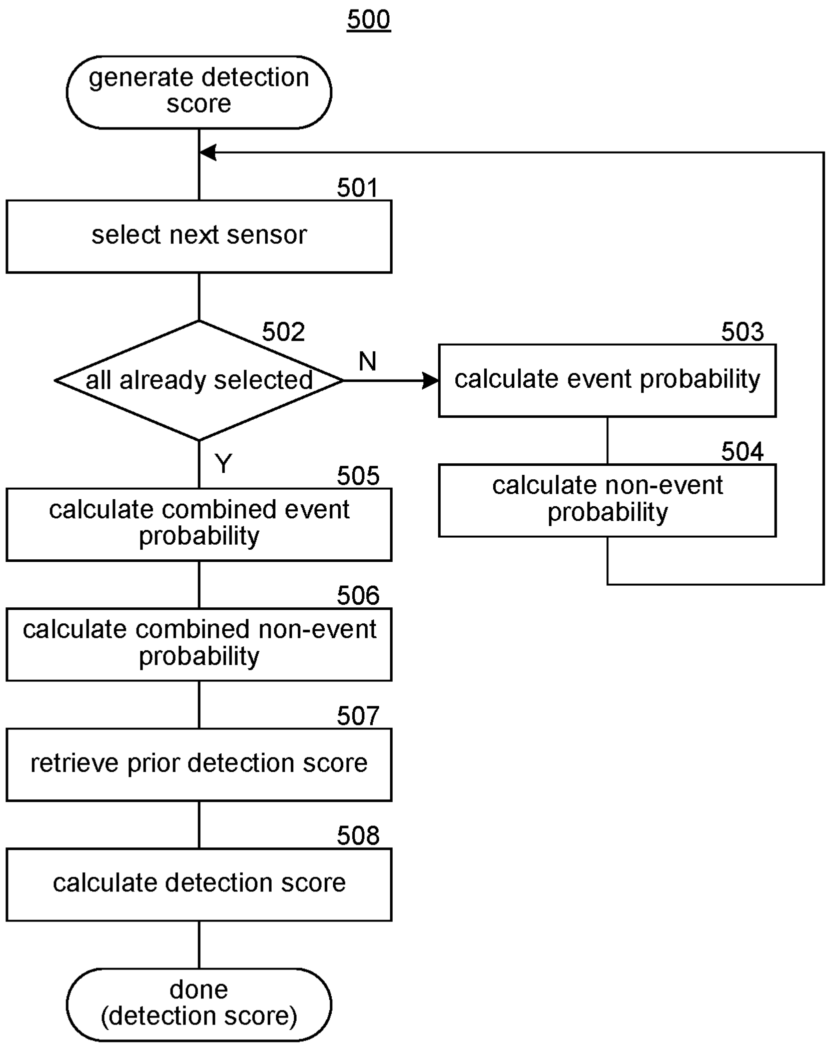
FIG. 5 is a flow diagram that illustrates the processing of a generate detection score component of the event detection algorithm in some embodiments.

FIG. 5 is a flow diagram that illustrates the processing of a generate detection score component of the event detection algorithm in some embodiments. The component 500 generates and returns the detection score based on the sensor readings. In block 501, the component selects the next sensor. In decision block 502, if all the sensors have already been selected, then the component continues at block 505, else the component continues at block 503. In block 503, the component calculates an event probability for the sensor reading of the selected sensor. In block 504, the component calculates a non-event (noise) probability for the sensor reading of the selected sensor and then loops to block 501 to select the next sensor. In block 505, the component calculates a combined event probability based on the event probabilities and the non-event probabilities. In block 506, the component calculates a combined non-event probability based on the non-event probabilities. In block 507, the component retrieves a prior detection score. In block 508, the component calculates the detection score based on the combined event probability, the combined non-event probability, and the prior detection score. The component then completes, returning the detection score.

The EDU processor may include a central processing unit, memory, a network interface, and a cellular radio link interface. The EDU processor may access computer-readable media that include computer-readable storage media (or mediums) and data transmission media. The computer-readable storage media are tangible storage means that do not include a transitory, propagating signal. Examples of computer-readable storage media include memory such as primary memory, cache memory, and secondary memory and other storage. The computer-readable storage media may have recorded on it or may be encoded with computer-executable instructions or logic that implements processing of the event detection algorithm. The data transmission media is used for transmitting data via transitory, propagating signals or carrier waves (e.g., electromagnetism) via a wired or wireless connection. Aspects of the event detection algorithm may be implemented in hardware using, for example, an application-specific integrated circuit (ASIC) or field programmable gate array (FPGA).

The following paragraphs describe various embodiments of aspects of an EDU. An implementation of an EDU may employ any combination of the embodiments. The processing described below may be performed by a computing device with a processor that executes computer-executable instructions stored on a computer-readable storage medium that implements an EDU.

In some embodiments, a method performed by an explosive event detection unit for detecting an explosive event is provided. The method for each of a plurality of different types of sensors that measure different event characteristics of an explosive event, receives sensor reading for that sensor, accesses a weight indicating contribution of a sensor reading of that sensor to detection of an explosive event, generates a non-event probability indicating whether the sensor reading for that sensor corresponds to a non-event based on a non-event probability distribution indicating probability of a non-event given a sensor reading for that sensor, and generates an event probability indicating whether the sensor reading for that sensor corresponds to an event based on an event probability distribution indicating probability of an event given a sensor reading for that sensor. The method generates a combined non-event probability based on the weights and the non-event probabilities and generates a combined event probability based on the weights, the non-event probabilities, and the event probabilities. When the combined non-event probability and the combined event probability satisfy an event detection criterion, the method indicates that an explosive event has been detected. In some embodiments, the explosive event is a gunshot. In some embodiments, the method further generates an event detection score based on the combined non-event probability and the combined event probability and wherein the event detection criterion is based on an event detection threshold. In some embodiments, the generating of the event detection score is further based on an event detection score generated based on prior sensor readings. In some embodiments, the non-event probability and the event probability are based on prior sensor readings. In some embodiments, the non-event probability distribution and the event probability distribution are Gaussian distributions. In some embodiments, the sensors are selected from a group consisting of a light sensor, a vibration sensor, and a sound wave sensor. In some embodiments, the weights sum to one. In some embodiments, the method when an explosive event has been detected, directs a countermeasure to the explosive event be taken. In some embodiments, the event detection unit includes a processor and the sensors. In some embodiments, the method is performed by an explosive event detection unit.

In some embodiments, a method performed by an event detection unit for detecting an event is provided. The method receives a sensor reading from a sensor of the event detection unit that measures an event characteristic of an even, generates an event detection score indicating whether an event has been detected, receives from another event detection unit an indication that an event has been detected, and indicates that an event has been detected based on the event detection score and the indication that an event has been detected by the other event detection unit. In some embodiments, the method further determines that an event has been detected based on the event detection score and sending to another event detection unit an indication that an event has been detected. In some embodiments, the method further triggers an alarm when an event has been detected. In some embodiments, the event is an explosive event. In some embodiments, each event detection unit includes multiple sensors of different types that measure different event characteristics. The method further, for each sensor, generates a non-event probability indicating whether a sensor reading for that sensor corresponds to a non-event based on a non-event probability distribution indicating probability of a non-event given a sensor reading for that sensor and generates an event probability indicating whether the sensor reading for that sensor corresponds to an event based on an event probability distribution indicating probability of an event given a sensor reading for that sensor. The method generates an event detection score based on the non-event probabilities, the event probabilities, and weights indicating contribution of a sensor reading of that sensor to detection of an event.

In some embodiments, an event detection unit for detecting an explosive event is provided. The event detection unit includes a plurality of different types of sensors for measuring characteristics of an explosive event represented as a measurement and an event notification component. The event detection unit further includes a computing system with a processor for executing instructions stored in a storage medium. The instructions when executed by the processor control the computing system to, for each sensor, receive a measurement for that sensor and generate a non-event probability and an event probability based on that measurement that indicates a likelihood that an explosive event has not occurred or has occurred. The instructions further control the computing system to determine whether an explosive event has occurred based on the non-event probabilities and event probabilities and when an explosive event has been determined to occur, direct the event notification component to output a notification that an explosive event has occurred. In some embodiments, the sensors are selected from a group consisting of an accelerometer, a microphone and a light sensor. In some embodiments, the event notification component is a connection to a computing device external to the event detection unit. In some embodiments, the event notification component generates a light-based alarm or a sound-based alarm. In some embodiments, the non-event probability for a sensor is based on a non-event probability distribution indicating probability of no explosive event given a measurement for that sensor and the event probability for a sensor is based on an event probability distribution indicating probability of an explosive event given a measurement for that sensor. In some embodiments, the non-event probability distribution and the event probability distribution are generated by calibrating the event detection unit based on sample occurrences of an event In some embodiments, a method performed by a computing system for detecting an explosive event is provided. For each of one or more of a plurality of explosive event detection units, the method receives an indication that an explosive event has been detected by that explosive event detection unit. The method determines whether the received indications satisfy a collective event detection criterion and upon determining that the collective event detection criterion is satisfied, outputs an indication that an explosive event has occurred. In some embodiments, the collective event detection criterion is satisfied when an indication that an explosive event has been detected is received from each of the plurality of explosive event detection units. In some embodiments, the collective event detection criterion is satisfied when an indication that an explosive event has been detected is received from a designated number of the plurality of explosive event detection units. In some embodiments, the explosive event detection units include sensors for measuring characteristics of an explosive event and are in proximity to one another such that when an explosive event occurs, the sensors of multiple explosive event detection units measure a characteristic of that explosive event. In some embodiments, each explosive event detection unit includes a computing system with a processor for executing instructions stored in a storage medium. The instructions when executed by the processor control the computing system to, for each sensor, receive a measurement for that sensor. The method generates an event detection score based on the measurements that indicates a likelihood that an explosive event has occurred. The method determines whether an explosive event has occurred based on the event detection score. When an explosive event has been determined to occur, the method outputs a notification of an explosive event. In some embodiments, the explosive event is a gunshot.

In some embodiments, a method performed by an event detection unit for detecting an event is provided. The method receives a sensor reading for each of a light sensor, a sound sensor, and a vibration sensor. For each sensor reading, the method generates a non-event probability indicating whether the sensor reading for that sensor corresponds to a non-event based on a non-event probability distribution indicating probability of a non-event given a sensor reading for that sensor and generates generating an event probability indicating whether the sensor reading for that sensor corresponds to an event based on an event probability distribution indicating probability of an event given a sensor reading for that sensor. The method determines whether an event has been detected based on the non-event probabilities and the event probabilities satisfying an event detection criterion. In some embodiments, the event is an explosive event. In some embodiments, the method determines is further based on weights assigned to the sensors.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

What is claimed is:

1. A method performed by an event detection unit, the method comprising:

for each of a plurality of sensors of different types in the event detection unit, each of which is to measure a different characteristic of an event of a particular type, receiving a sensor reading from that sensor;

obtaining a weight indicating contribution of a sensor reading of that sensor to detection of an event;

generating a non-event probability indicative of whether the sensor reading for that sensor corresponds to a non-event; and generating an event probability indicative of whether the sensor reading for that sensor corresponds to an event;

generating a combined non-event probability based on the weights and the non-event probabilities from the plurality of sensors;

generating a combined event probability based on the weights and the event probabilities from the plurality of sensors;

determining that an event has been detected based on the combined non-event probability and the combined event probability; and outputting an indication that the event has been detected in response to said determining.

2. The method of claim 1, further comprising sending to another, external event detection unit a signal indicative that an event has been detected in response to said determining.

3. The method of claim 1, further comprising:

receiving from another, external event detection unit a signal indicative that an event has been detected;

wherein said determining that an event has been detected is further based on the signal.

4. The method of claim 1, further comprising:

sending to another, external event detection unit a first signal indicative that an event has been detected in response to said determining; and receiving from another, external event detection unit a second signal indicative that an event has been detected;

wherein said determining that an event has been detected is further based on the second signal.

5. The method of claim 1, further comprising triggering an alarm in response to said determining that an event has been detected.

6. The method of claim 1, further comprising directing a countermeasure to be taken in response to said determining that an event has been detected.

7. The method of claim 1, wherein the event of the particular type is an explosive event.

8. The method of claim 7, wherein the event of the particular type is a gunshot.

9. The method of claim 1, wherein for each of the plurality of sensors:

said generating the non-event probability is based on a non-event probability distribution indicating probability of a non-event given a sensor reading for that sensor; and said generating the event probability is based on an event probability distribution indicating probability of an event given a sensor reading for that sensor.

10. The method of claim 1, wherein said determining is further based on a prior sensor reading.

11. An event detection unit comprising:

at least one processor;

a plurality of sensors coupled to the at least one processor, each of which is to measure a different characteristic of an event of a particular type; and at least one memory accessible to the at least one processor and containing instructions, execution of which by the at least one processor causes the event detection unit to perform a process that comprises, for each of the plurality of sensors, receiving a sensor reading from that sensor;

obtaining a weight indicating contribution of a sensor reading of that sensor to detection of an event;

generating a non-event probability indicative of whether the sensor reading for that sensor corresponds to a non-event; and generating an event probability indicative of whether the sensor reading for that sensor corresponds to an event;

generating a combined non-event probability based on the weights and the non-event probabilities from the plurality of sensors;

generating a combined event probability based on the weights and the event probabilities from the plurality of sensors;

determining that an event has been detected based on the combined non-event probability and the combined event probability; and outputting an indication that the event has been detected in response to said determining.

12. The event detection unit of claim 11, wherein said process further comprises sending to another, external event detection unit a signal indicative that an event has been detected in response to said determining.

13. The event detection unit of claim 11, wherein said process further comprises:

receiving from another, external event detection unit a signal indicative that an event has been detected;

wherein said determining that an event has been detected is further based on the signal.

14. The event detection unit of claim 11, wherein said process further comprises:

sending to another, external event detection unit a first signal indicative that an event has been detected in response to said determining; and receiving from another, external event detection unit a second signal indicative that an event has been detected;

wherein said determining that an event has been detected is further based on the second signal.

15. The event detection unit of claim 11, wherein said process further comprises triggering an alarm in response to said determining that an event has been detected.

16. The event detection unit of claim 11, wherein said process further comprises directing a countermeasure to be taken in response to said determining that an event has been detected.

17. The event detection unit of claim 11, wherein the event of the particular type is an explosive event.

18. The event detection unit of claim 17, wherein the event of the particular type is a gunshot.

19. The event detection unit of claim 11, wherein for each of the plurality of sensors:

said generating the non-event probability is based on a non-event probability distribution indicating probability of a non-event given a sensor reading for that sensor; and said generating the event probability is based on an event probability distribution indicating probability of an event given a sensor reading for that sensor.

20. The event detection unit of claim 11, wherein said determining is further based on a prior sensor reading.

* * * * *